United States Patent
Murata et al.

(10) Patent No.: US 11,989,226 B2
(45) Date of Patent: May 21, 2024

(54) CLASSIFICATION SYSTEM AND CLASSIFICATION METHOD USING LERNED MODEL AND MODEL INCLUDING DATA DISTRIBUTION

(71) Applicant: Panasonic Intellectual Property Management Co., Ltd., Osaka (JP)

(72) Inventors: Hisaji Murata, Osaka (JP); Hideto Motomura, Kyoto (JP); Jeffry Fernando, Osaka (JP); Yuya Sugasawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

(21) Appl. No.: 17/756,863

(22) PCT Filed: Dec. 17, 2020

(86) PCT No.: PCT/JP2020/047190
§ 371 (c)(1),
(2) Date: Jun. 3, 2022

(87) PCT Pub. No.: WO2021/140865
PCT Pub. Date: Jul. 15, 2021

(65) Prior Publication Data
US 2022/0414143 A1  Dec. 29, 2022

(30) Foreign Application Priority Data

Jan. 8, 2020 (JP) .............................. JP2020-001729

(51) Int. Cl.
*G06F 16/00* (2019.01)
*G06F 16/55* (2019.01)
*G06Q 50/04* (2012.01)

(52) U.S. Cl.
CPC ............. *G06F 16/55* (2019.01); *G06Q 50/04* (2013.01)

(58) Field of Classification Search
CPC ...... G06F 16/55; G06Q 50/04; G05B 19/418; G06T 7/00
See application file for complete search history.

(56) References Cited

U.S. PATENT DOCUMENTS

2010/0250542 A1* 9/2010 Fujimaki ................ G06N 20/10
707/E17.089

FOREIGN PATENT DOCUMENTS

JP  2019-049940  3/2019

OTHER PUBLICATIONS

International Search Report of PCT application No. PCT/JP2020/047190 dated Mar. 2, 2021.

* cited by examiner

*Primary Examiner* — Jared M Bibbee
(74) *Attorney, Agent, or Firm* — Rimon P.C.

(57) ABSTRACT

Reliability regarding a class determination for an object is improved. Classification system includes first classification part, second classification part, and determination part. First classification part classifies first target data into at least one of a plurality of first classes. Second classification part classifies second target data into at least one of a plurality of second classes. Determination part decides whether to use one or both of a first classification result that is a classification result obtained by first classification part and a second classification result that is a classification result obtained by second classification part, and determines a class of object based on one or both of them. The first target data is image data of object. The second target data is manufacturing data regarding a manufacturing condition of object.

10 Claims, 12 Drawing Sheets

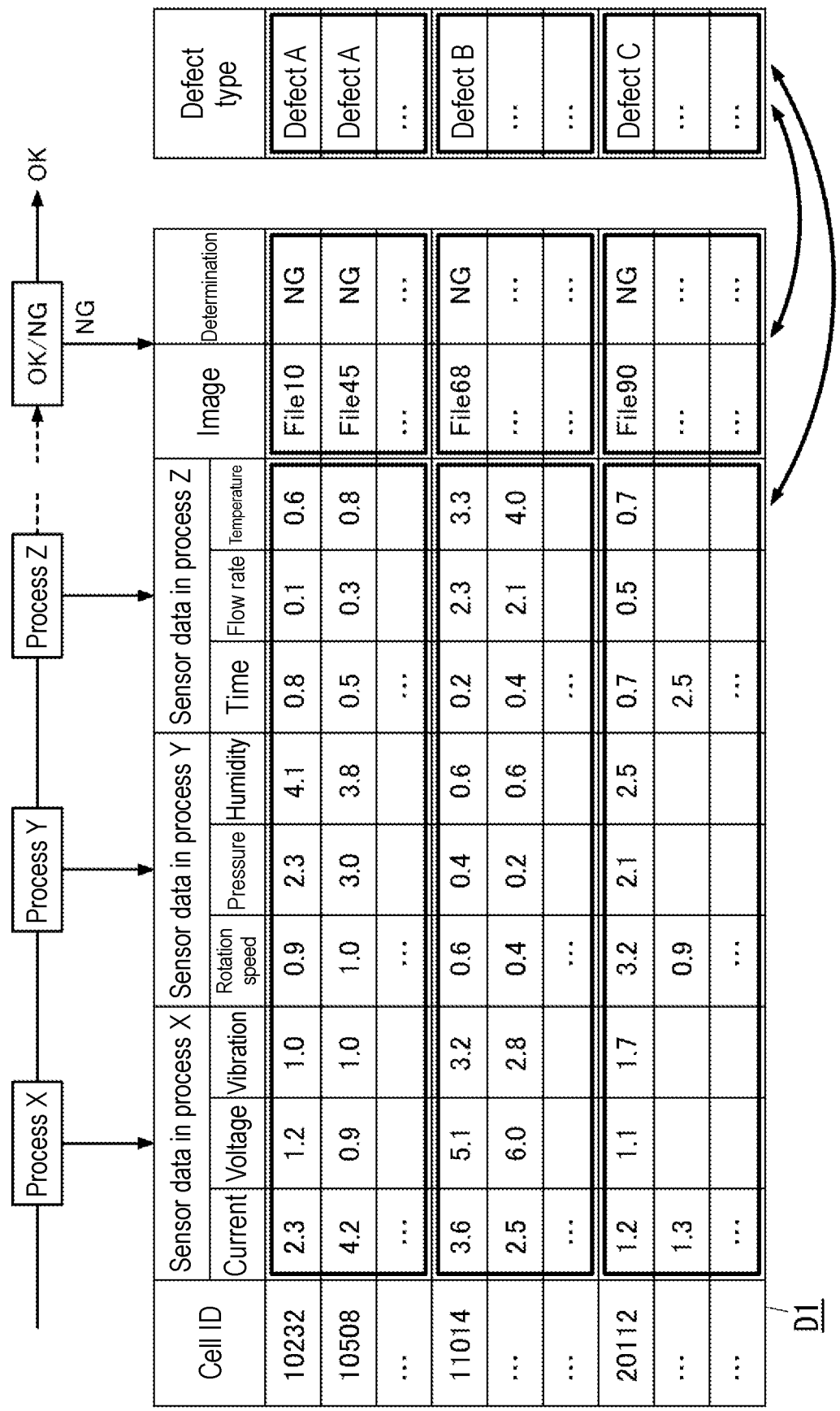

| Image 1 | Classification category | Class 1 | Class 2 | Class 3 |
|---|---|---|---|---|
| 52 (5) | Defect type | A | B | C |
| | Image determination | × | ○ | × |
| | Determination ground Spatial position | Not applicable | | |
| Output | | | ○ | |

C1 C1 C1

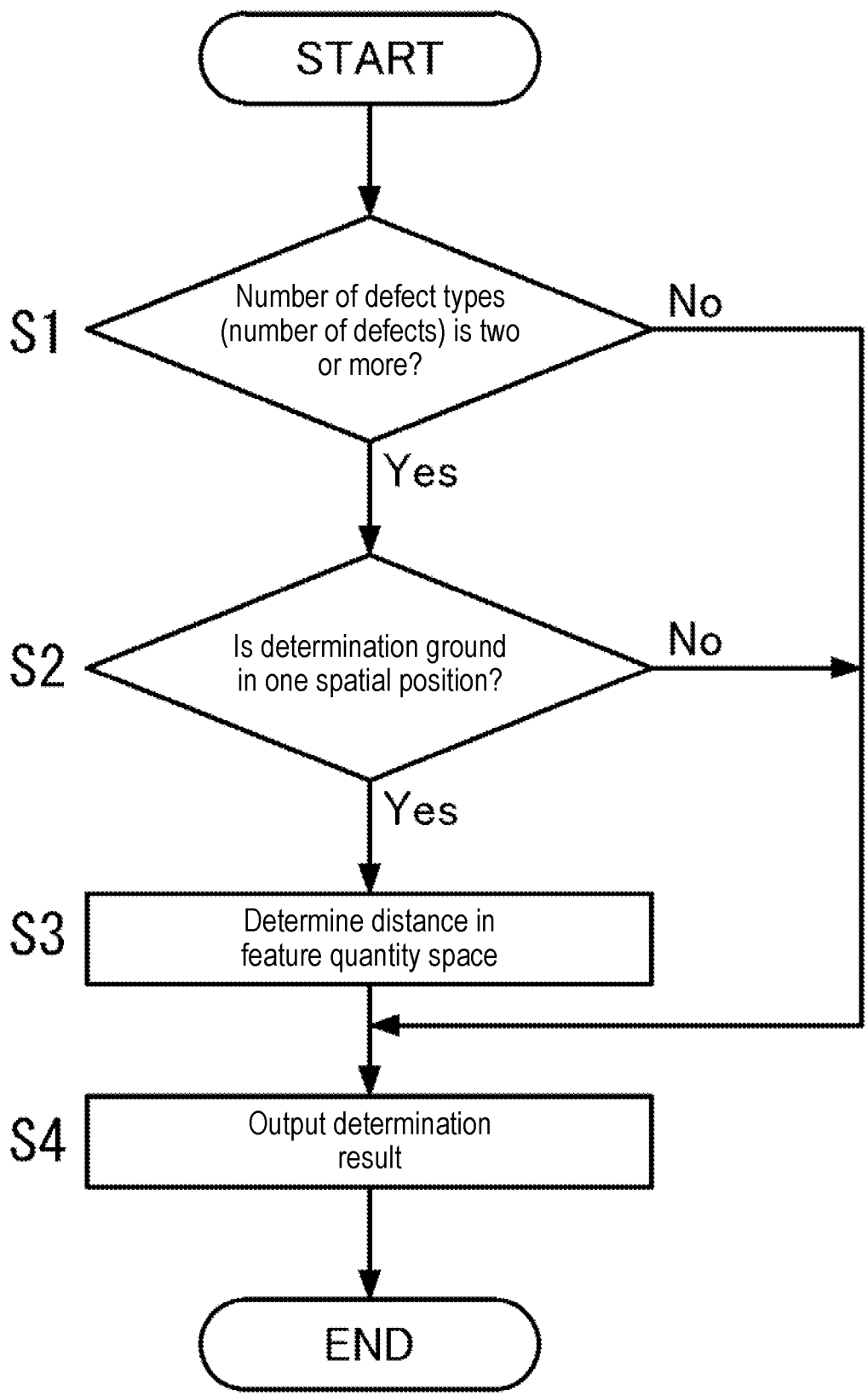

| Image 4 | Classification category | Class 1 (C1) | Class 2 (C1) | Class 3 (C1) | Others (C1) |
|---|---|---|---|---|---|
| | Defect type | A | B | C | Unknown |
| | Image determination | × | × | × | ○ |
| | Determination ground Spatial position | – | – | – | – |

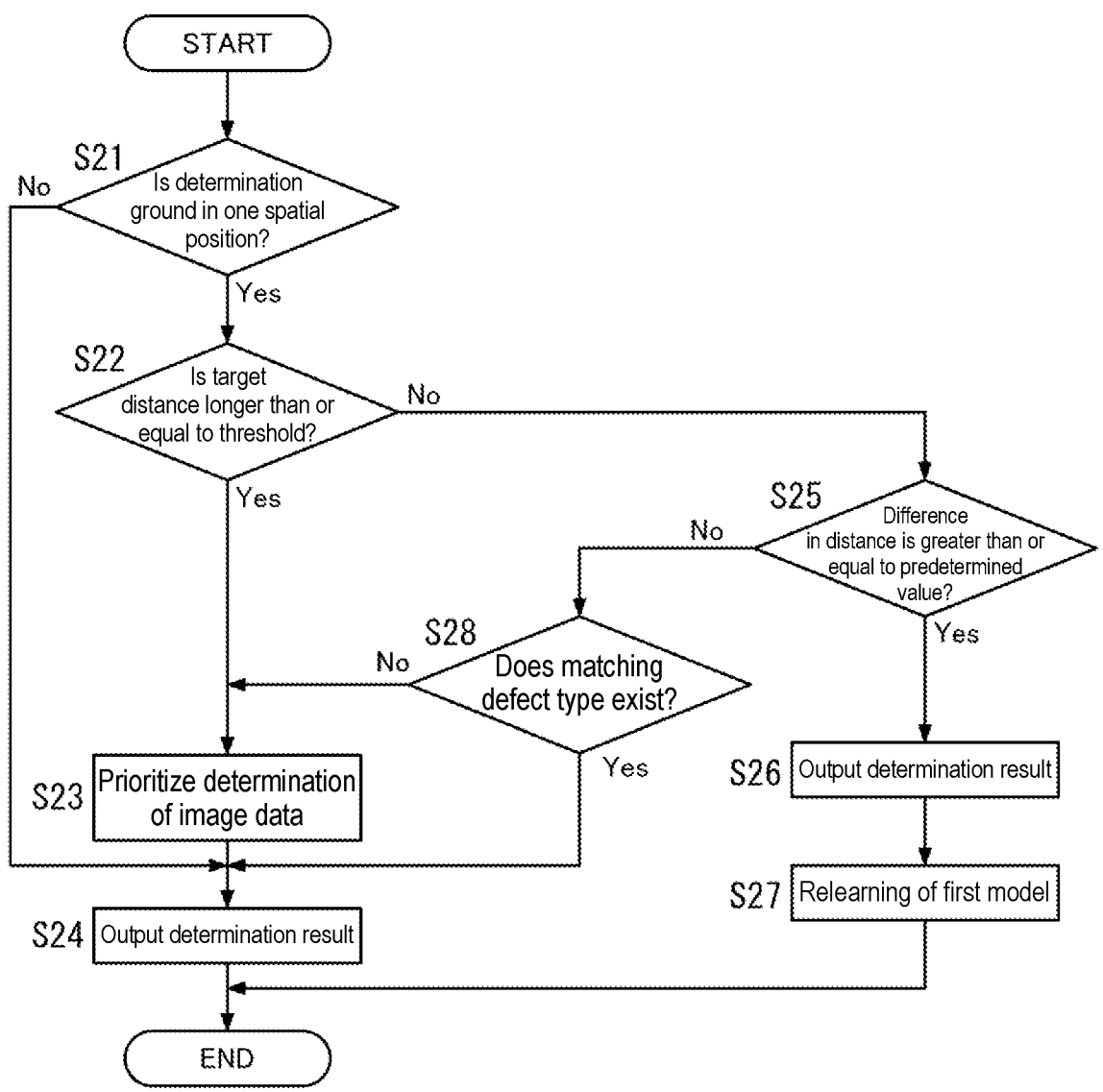

CLASSIFICATION SYSTEM AND CLASSIFICATION METHOD USING LERNED MODEL AND MODEL INCLUDING DATA DISTRIBUTION

CROSS-REFERENCE TO RELATED APPLICATIONS

This application is a U.S. national stage application of the PCT International Application No. PCT/JP2020/047190 filed on Dec. 17, 2020, which claims the benefit of foreign priority of Japanese patent application No. 2020-001729 filed on Jan. 8, 2020, the contents all of which are incorporated herein by reference.

FIELD OF THE INVENTION

The present disclosure generally relates to a classification system, a classification method, and a program. More specifically, the present disclosure relates to a classification system, a classification method, and a program for determining a class of an object.

DESCRIPTION OF THE RELATED ART

PTL 1 discloses an anomaly process estimation method for accurately estimating an anomaly process that causes quality anomaly of a product. In this anomaly process estimation method, sensor data from a sensor in a manufacturing line including a plurality of processes is collected. Machine learning is then executed so that an elapsed time between processes is included in a feature vector, based on sensor data of a product having normal quality, thereby generating a plurality of correlation models between the sensors related to the respective processes. Then, a degree of deviation from a normal state in each process is evaluated based on an output value of each correlation model, and an anomalous process that causes quality anomaly of a product is determined among the plurality of processes based on the deviation degree.

CITATION LIST

Patent Literature

PTL 1: Unexamined Japanese Patent Publication No. 2019-49940

SUMMARY OF THE INVENTION

Incidentally, it is sometimes desired to determine a class (for example, a type such as anomaly or defect) of a product (object) more accurately.

The present disclosure has been made in view of the above circumstances, and an object of the present disclosure is to provide a classification system, a classification method, and a program capable of improving reliability regarding a class determination for an object.

A classification system according to one aspect of the present disclosure includes a first classification part, a second classification part, and a determination part. The first classification part classifies first target data into at least one of a plurality of first classes. The second classification part classifies second target data into at least one of a plurality of second classes. The determination part decides whether to use one or both of a first classification result that is a classification result obtained by the first classification part and a second classification result that is a classification result obtained by the second classification part, and determines a class of an object based on the one or both of them. The first target data is image data of an object. The second target data is manufacturing data regarding a manufacturing condition of an object.

A classification method according to one aspect of the present disclosure includes a first classification step, a second classification step, and a determination step. In the first classification step, first target data is classified into at least one of a plurality of first classes. In the second classification step, second target data is classified into at least one of a plurality of second classes. In the determination step, a decision is made whether to use one or both of a first classification result that is a classification result obtained in the first classification step and a second classification result that is a classification result obtained in the second classification step, and a class of an object is determined based on the one or both of them. The first target data is image data of an object. The second target data is manufacturing data regarding a manufacturing condition of an object.

A program according to one aspect of the present disclosure is a program that causes one or more processors to execute the classification method of the present disclosure.

The present disclosure offers an advantage that reliability regarding the class determination for the object can be improved.

BRIEF DESCRIPTION OF THE DRAWINGS

FIG. 5 is a diagram for describing a first model and a second model in the classification system.

FIG. 8 is a flowchart regarding an operation of the classification system.

FIG. 12 is a flowchart regarding an operation of the classification system according to a second modification.

DETAILED DESCRIPTION OF THE PREFERRED EMBODIMENTS

(1) Outline

Each of the drawings described in the following exemplary embodiments is a schematic view, and the ratio of the size and the thickness of each component in each drawing does not necessarily reflect the actual dimensional ratio.

Figure 1:
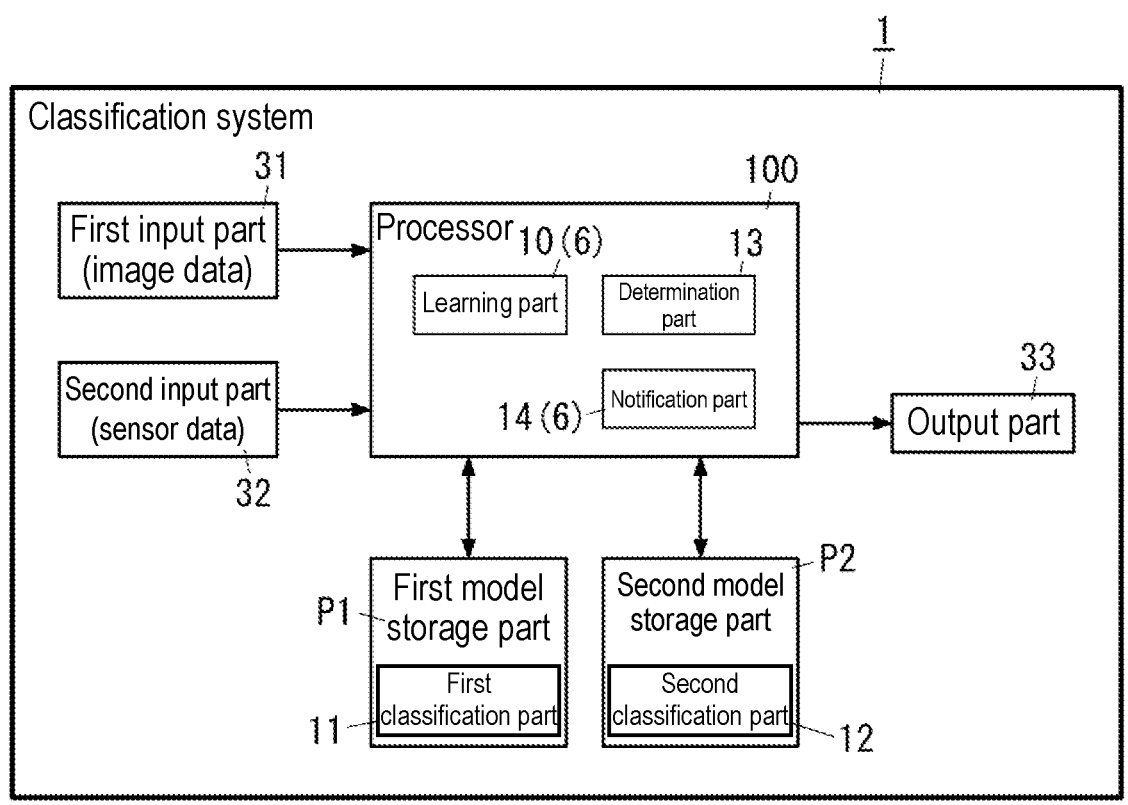
FIG. 1 is a schematic configuration diagram of a classification system according to one exemplary embodiment.
Figure 2A:
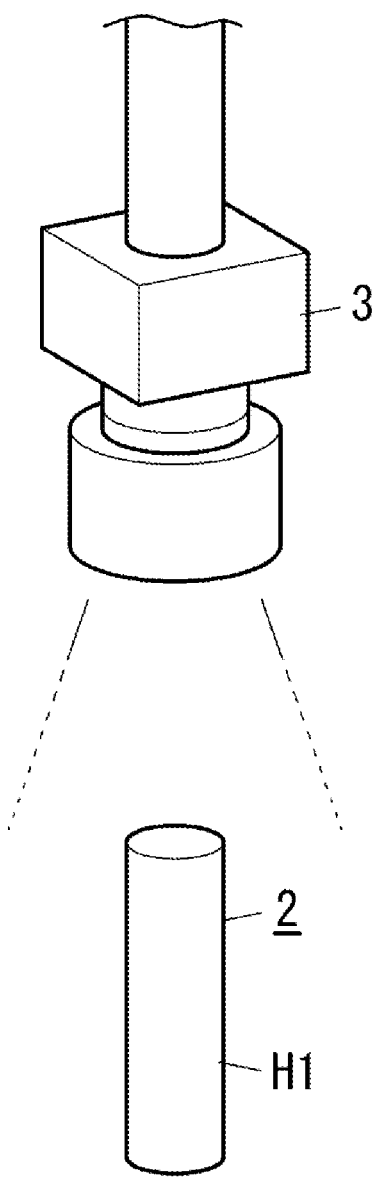
FIG. 2A is a perspective view of an object (battery can) and an imaging device in the classification system, and is a conceptual diagram for describing image data of an object.

FIG. 1 is a schematic configuration diagram of classification system 1 according to one exemplary embodiment. FIG. 2A is a perspective view of object 2 (battery can H1) and imaging device 3 in classification system 1, and is a conceptual diagram for describing image data of an object. Classification system 1 according to the present exemplary embodiment includes, as illustrated in FIG. 1, first classification part 11, second classification part 12, and determination part 13.

Figures 6, 7A:
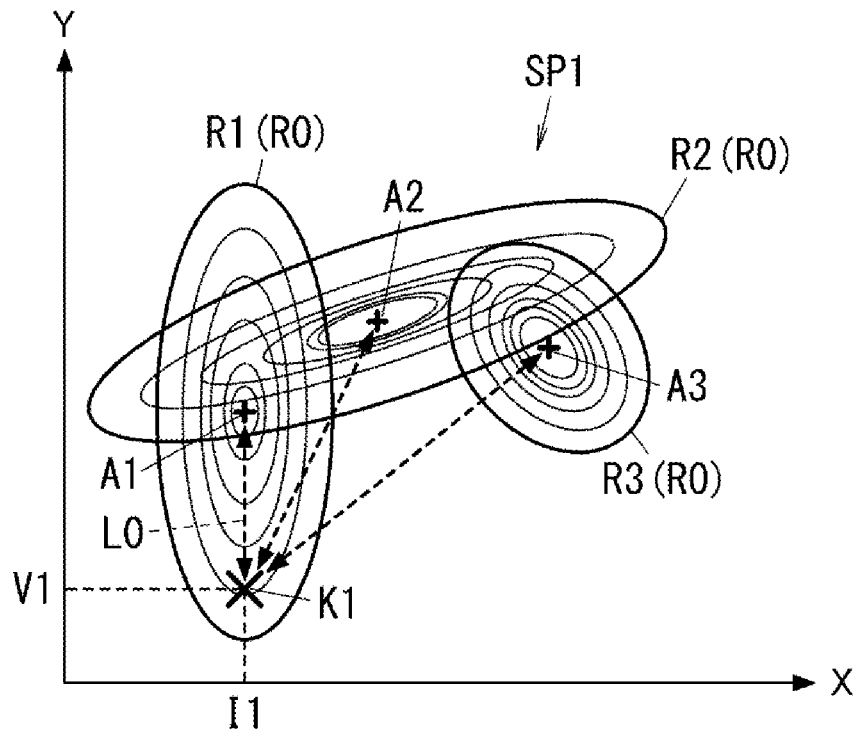
FIG. 6 is a conceptual diagram regarding the second model.
FIG. 7A is an explanatory diagram regarding three pieces of image data in the classification system.
Figure 7B:
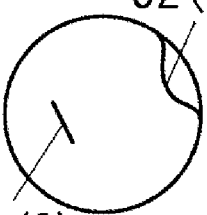
FIG. 7B is an explanatory diagram regarding three pieces of image data in the classification system.
Figure 7C:
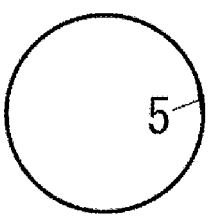
FIG. 7C is an explanatory diagram regarding three pieces of image data in the classification system.

First classification part 11 classifies first target data into at least one of a plurality of first classes C1 (see FIGS. 7A to 7C). The first target data is image data of object 2. Here, as an example, first classification part 11 is a learned model (hereinafter, referred to as a "first model" in some cases) that has learned the plurality of first classes C1 from (a plurality of pieces of) image data, and is stored in first model storage part P1. That is, the first model is a model generated by machine learning. Hereinafter, as illustrated in FIG. 2A, as an example, it is assumed that object 2 is battery can H1 (metal cylindrical battery case) for an alkaline battery, a lithium ion battery, or the like.

Second classification part 12 classifies second target data into at least one of a plurality of second classes C2 (see FIG. 7C). The second target data is manufacturing data regarding a manufacturing condition of object 2. Here, as an example, second classification part 12 is a model (hereinafter, referred to as a "second model" in some cases) in which the plurality of second classes C2 is associated with a data distribution of a feature quantity regarding the manufacturing condition. As an example, the second model is not a learned model.

Determination part 13 decides whether to use one or both of a first classification result that is a classification result obtained by first classification part 11 and a second classification result that is a classification result obtained by second classification part 12, and determines a class of object 2 based on the one or both of them. The "class of object" herein is, for example, a type of one or a plurality of events occurring in (manufactured) battery can H1, and is assumed to be linked to the "defect type" here. Thus, as an example here, the plurality of first classes C1 and the plurality of second classes C2 are specified by a defect of object 2.

According to this configuration, determination part 13 decides whether to use one or both of the first classification result and the second classification result, and determines a class (herein, a defect type) of object 2 based on the one or both of them. Therefore, it is possible to improve the reliability regarding the class determination for object 2 as compared with a case of determining the class of object 2 based only on the image data or only on the manufacturing data.

(2) Details

Hereinafter, a configuration of classification system 1 according to the present exemplary embodiment will be described in detail with reference to FIGS. 1 to 8.

(2.1) Overall Configuration

Classification system 1 according to the present exemplary embodiment includes, as described above, first classification part 11 and second classification part 12. As illustrated in FIG. 1, classification system 1 further includes processor 100, first input part 31, second input part 32, output part 33, first model storage part P1 that stores the first model, and second model storage part P2 that stores the second model. Above-described determination part 13 is provided in processor 100.

As described above, object 2 for which classification system 1 makes a class determination is battery can H1 for an alkaline battery, a lithium ion battery, or the like as illustrated in FIG. 2A. Battery can H1 is a cylindrical battery case made of metal, and has a bottomed cylindrical shape with one end surface (upper end surface in FIG. 2A) being opened.

As described above, first classification part 11 classifies the first target data that is the image data of object 2 into "at least one first class C1" among the plurality of first classes C1. That is, one piece of image data may be classified into two or more first classes C1.

Figure 2B:
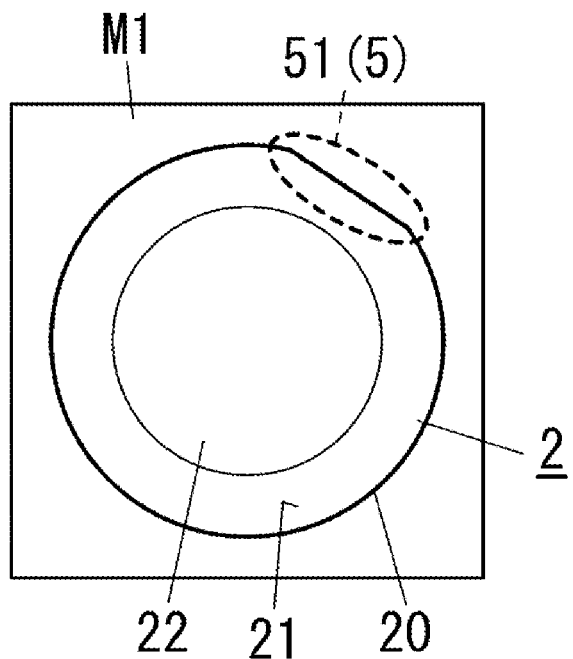
FIG. 2B is a diagram illustrating an example (defect type "A") of the image data of the object.
Figure 2C:
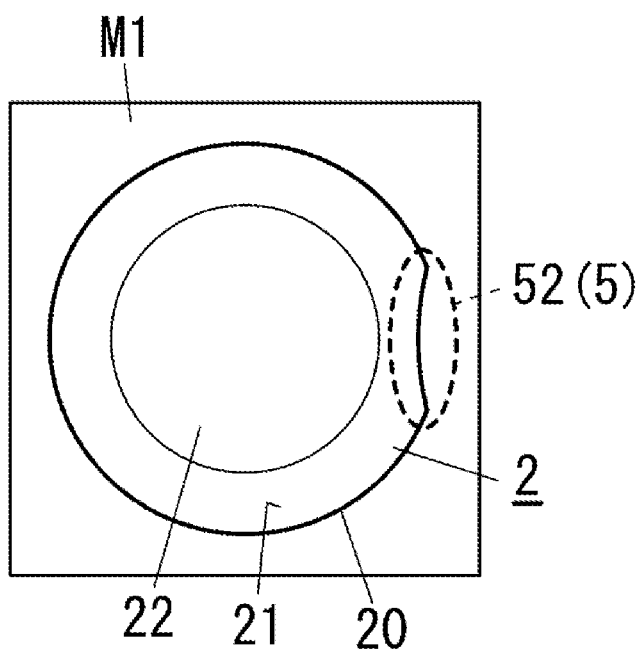
FIG. 2C is a diagram illustrating an example (defect type "B") of the image data of the object.

The image data of object 2 (battery can H1) is data representing an image M1 (see FIGS. 2B and 2C). The image M1 is an image of object 2. The image M1 is captured by imaging device 3 (camera) from above in a state where battery can H1 stands on a horizontal installation surface with the opened one end surface facing upward. Battery can H1 is a can after manufacturing and is hollow. Therefore, the image M1 shows edge portion 20, inner peripheral surface 21, and bottom surface 22 of battery can H1.

FIGS. 2B and 2C each illustrate the image M1 in an example of object 2 (battery can H1) in an anomalous state.

In the image M1 of FIG. 2B, edge portion 20 of object 2 has flat recess 51 recessed inward. In other words, the event occurring in object 2 of FIG. 2B is defect 5, specifically, flat recess 51. Hereinafter, the type (class) into which flat recess 51 is classified may be referred to as defect type "A".

In the image M1 of FIG. 2C, edge portion 20 of object 2 has curved recess 52 recessed inward. In other words, the event occurring in object 2 of FIG. 2C is defect 5, specifically, curved recess 52. Hereinafter, the type (class) into which curved recess 52 is classified may be referred to as defect type "B".

The event occurring in object 2 also includes linear flaw 53 (see FIG. 7B) occurring on inner peripheral surface 21 or bottom surface 22 of object 2. Hereinafter, the type (class) into which linear flaw 53 is classified may be referred to as defect type "C".

Defect 5 that can occur in battery can H1 is not limited to flat recess 51, curved recess 52, and linear flaw 53. Other examples of defect 5 that can occur in battery can H1 include a point dent, a circular scratch, dirt, and liquid adhesion, but here, for convenience of description, only the above three defect types "A" to "C" will be described.

In classification system 1 according to the present exemplary embodiment, a more accurate determination is made as to what type of defect 5 has occurred and at how many locations defect 5 has occurred in object 2 of interest (class determination for object 2). In classification system 1 according to the present exemplary embodiment, a final output with respect to the input of the target data (the image data as the first target data) is a "determination result" indicating whether object 2 is in a normal state without a defect or an anomalous state with a defect, and which class (defect type) of the defect in the anomalous state. Therefore, classification system 1 can be used for inspecting object 2. Hereinafter, when the determination result of object 2 indicates a normal state without a defect, it may be referred to as "OK determination". On the other hand, when the determination result of object 2 indicates an anomalous state with a defect, it may be referred to as "NG determination".

Figure 3:
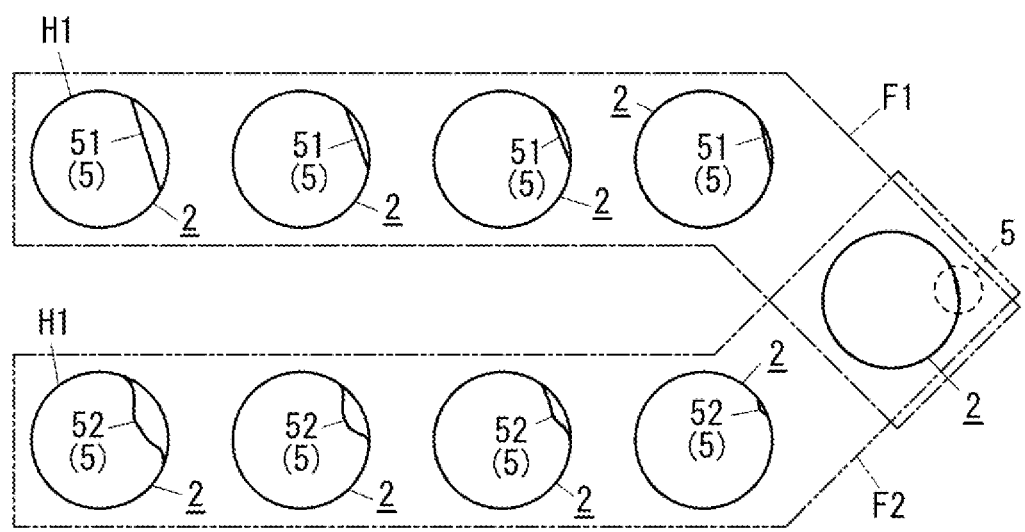
FIG. 3 is a schematic diagram of two types of defects in the object.

In particular, although details will be described later, in a case where the size of defect 5 is comparatively small, defect 5 might be determined as flat recess 51 or curved recess 52. For example, FIG. 3 is a schematic view of defects 5 regarding a total of nine objects 2, and illustrates a case where all four objects 2 in the upper row (see frame F1 of an alternate long and short dashed line) have defects 5 related to the defect type "A", but the sizes of flat recesses 51 decrease from the left side toward the right side. In addition, all four objects 2 in the lower row (see frame F2 of a chain double-dashed line) have defects 5 related to the defect type "B", but the sizes of curved recesses 52 decrease from the left side toward the right side.

Here, the size of defect 5 of object 2 at the right end included in both frame F1 and frame F2 is smaller than sizes of other defects 5. Therefore, it might be difficult to determine using only image data whether the class is the defect type "A" or the defect type "B".

On the other hand, classification system 1 according to the present exemplary embodiment can achieve class determination with higher accuracy accessorily using the manufacturing data as the second target data. In particular, when some defect (failure) occurs in object 2, any of the plurality of processes of the manufacturing line is likely to have a factor of the defect (for example, setting errors of various parameters in a production facility, occurrence of a defect in equipment, or the like). Therefore, in this case, manufacturing data in each process is also likely to include an anomalous numerical value. Therefore, class determination with higher accuracy can be achieved by utilizing also manufacturing data.

(2.2) Two Input Parts and Output Part

Each of first input part 31 and second input part 32 is used to input data to classification system 1.

Examples of data to be input to classification system 1 by each of first input part 31 and second input part 32 may include information for execution of machine learning, information for execution of determination processing, and information for operation of classification system 1.

Here, the data to be input by first input part 31 mainly includes image data (first target data). That is, the input data to first input part 31 mainly includes image data (inspection image) to be inspected captured by imaging device 3.

On the other hand, the data to be input by second input part 32 mainly includes manufacturing data (second target data) regarding a manufacturing condition of object 2. Here, as an example, the manufacturing data is sensor data directly detected by various sensors (described later) installed in a manufacturing line, estimation data estimated based on the sensor data, or the like. That is, the input data to second input part 32 mainly includes data (actual data) regarding a current (value), a voltage (value), a temperature, a humidity, a time, a flow rate, or the like applied in one or a plurality of manufacturing processes of the manufacturing line of object 2.

Each of first input part 31 and second input part 32 includes one or more interfaces for inputting data. The one or more interfaces include a port for inputting data and an input device for operating classification system 1. Examples of the input device include a keyboard, a mouse, a track ball, and a touch pad.

Each (input port) of first input part 31 and second input part 32 is electrically connected to processor 100, and transmits the above-described input data to processor 100.

Each image data is associated with the manufacturing data regarding the manufacturing condition of object 2. Specifically, "cell ID" (see FIG. 5) is assigned as an identification number to each manufactured object 2, and each cell ID is associated with manufacturing data and an image (data). In other words, the data to be input by first input part 31 includes image data and a cell ID associated with the image data. In a similar manner, the data to be input by second input part 32 includes manufacturing data and a cell ID associated with the manufacturing data. Therefore, even if processor 100 acquires the image data and the manufacturing data at different timings, for example, respectively through the input parts, it can specify the manufacturing data associated with the image data (or the image data associated with the manufacturing data) based on the cell ID.

Output part 33 is used to output data from classification system 1. Examples of data to be output from classification system 1 by output part 33 may include information for execution of machine learning, information for execution of determination processing, and information for an operation of classification system 1. In particular, the data to be output by output part 33 includes information about the above-described "determination result" as an example.

Output part 33 includes one or more interfaces for outputting data. The one or more interfaces include a port for outputting data, an image display device for displaying data, a speaker for outputting a voice message and a notification sound (alarm sound), and the like. The image display device may include a thin display device such as a liquid crystal display or an organic electro-luminescence (EL) display.

A user who uses classification system 1 can browse, for example, a list related to the determination results for the plurality of objects 2 through the image display device of output part 33. In particular, a notification content of notification part 14, described later, can be notified to a user by output part 33, for example.

(2.3) First Model and First Model Storage Part

The first model (first classification part 11) is used to determine image data (first target data) to be input from first input part 31. The first model is a learned model that has learned a relationship between the image data and the determination results. In other words, first classification part 11 is a learned model that has learned the plurality of first classes C1 (see FIGS. 7A to 7C) from the image data of object 2. Therefore, in the present exemplary embodiment, the "first classification result" that is the classification result from first classification part 11 is a "result" from the learned model.

First classification part 11 (first model) classifies image data of object 2 into at least one of the plurality of first classes C1. Here, the plurality of first classes C1 may include "class 1", "class 2", and "class 3" (see FIGS. 7A to 7C) as classification categories. In addition, first classification part 11 classifies the image data of object 2 based on the type of one or a plurality of events (defect 5 in this case) occurring in object 2 in the image data. "Class 1", "class 2", and "class 3" are linked to the defect type "A", the defect type "B", and the defect type "C" on a one-to-one basis, respectively.

Learning part 10 (described later) of processor 100 generates a learned model (first model) by supervised learning using, for example, a learning data set. Specifically, for example, a setting person (person) labels, as teacher data, a plurality of pieces of image data having a defect visually "determined as No Good (NG)" with one (or a plurality) of the defect type "A", the defect type "B", and the defect type "C". The setting person then receives the labeled data from, for example, first input part 31. Then, learning part 10 creates a first model (image classification model) through machine learning using the labeled data (image data and defect type).

For example, with reference to FIG. 5 (data group D1), the image data "file 10" and "file 45" . . . that has been visually "determined as NG" by the setting person are each labeled with the defect type "A". The image data "file 68" . . . that has visually "determined as NG" by the setting person is labeled with the defect type "B". The image data "file 90" . . . that has been visually "determined as NG" by the setting person is labeled with the defect type "C".

First model storage part P1 stores the first model. First model storage part P1 includes at least one or more storage devices. Examples of the storage device are a random access memory (RAM) or an electrically erasable programmable read only memory (EEPROM).

(2.4) Second Model and Second Model Storage Part

The second model (second classification part 12) is used to determine manufacturing data (second target data) to be input from second input part 32. The second model is not a learned model but a model created by a setting person (person). Second classification part 12 is a model in which each of the plurality of second classes C2 (see FIG. 7C) is associated with a data distribution of a feature quantity (in FIG. 5, applied current (value), voltage (value), vibration, rotation speed, pressure, humidity, time, flow rate, or temperature) regarding the manufacturing condition. Therefore, in the present exemplary embodiment, the "second classification result" that is the classification result from second classification part 12 is a "result" from the second model.

Second classification part 12 (second model) classifies the manufacturing data (a numerical value regarding the feature quantity such as a current) of object 2 into at least one of the plurality of second classes C2. The plurality of second classes C2 may include "class 1", "class 2", and "class 3" as classification categories. "Class 1", "class 2", and "class 3" are linked to the defect type "A", the defect type "B", and the defect type "C" on a one-to-one basis, respectively. That is, here, the plurality of first classes C1 and the plurality of second classes C2 match each other.

The term "match" as used herein means that the number of the first classes C1 is equal to the number of the second classes C2, and the defect types linked to "class 1" to "class 3" of the first classes C1 are also equal to the defect types linked to "class 1" to "class 3" of the second classes C2. For example, the plurality of first classes C1 and the plurality of second classes C2 may mismatch each other. For example, the number of the second classes C2 may be smaller than the number of the first classes C1. However, the plurality of first classes C1 and the plurality of second classes C2 are desirably equal to each other as for at least one or more defect types.

Here, as an example, it is assumed that object 2 is manufactured through three processes (process X, process Y, and process Z) as illustrated in FIG. 5. In other words, the manufacturing line of object 2 includes process X, process Y, and process Z. In FIG. 5, process X, process Y, and process Z are illustrated in this order from the left, but the order of the actual processes is not illustrated. The number of processes is not limited to three.

In the data group D1 of FIG. 5, the data in process X includes the feature quantities regarding a current (value), a voltage (value), and a vibration as an example of the feature quantities regarding the manufacturing conditions. These feature quantities are sensor data detected by one or a plurality of sensors in process X. The one or plurality of sensors in process X may include, for example, current and voltage sensors that monitor a current and a voltage of a production facility (e.g., an actuator of a processing machine) used in process X. The one or plurality of sensors may include a vibration sensor that detects vibration occurring in the production facility or an ambient environment in process X. The feature quantities are not limited to the sensor data directly detected by the respective sensors. For example, "vibration" may be estimated based on a harmonic component in a waveform of an alternating current of the production facility (for example, an alternating current motor) used in process X, instead of using the vibration sensor.

In the data group D1 of FIG. 5, the data in process Y includes the feature quantities regarding a rotation speed, a pressure, and a humidity as an example of the feature quantities regarding the manufacturing conditions. These feature quantities are sensor data detected by one or a plurality of sensors in process Y. The one or plurality of sensors in process Y may include, for example, an angular velocity sensor that monitors the rotation speed of a production facility (for example, a motor) used in process Y, a pressure sensor that monitors the pressure of the production facility (for example, a press), and a humidity sensor that monitors the humidity in the production facility or the ambient humidity.

In the data group D1 of FIG. 5, the data in process Z includes the feature quantities regarding a time, a flow rate, and a temperature as an example of the feature quantities regarding the manufacturing conditions. These feature quantities are sensor data detected by the one or plurality of sensors in process Z. The one or plurality of sensors in process Z may include, for example, a timing sensor that monitors an application time of a solution used in the production facility in process Z, a flow rate sensor that monitors a flow rate of a solution, and a temperature sensor that monitors a temperature of a solution.

In the example of FIG. 5, the feature quantities include three types in each process, but the number of types is not particularly limited, and may be one, two, or four or more. In addition, the number of types may be different among the processes.

Each cell ID is associated with the feature quantities (numerical values) actually applied to object 2 at the time of manufacturing object 2 associated with each cell ID, as for the feature quantities regarding the manufacturing conditions in each of above-described processes X to Z. Specifically, object 2 associated with the cell ID "10232" is manufactured through process X under the manufacturing conditions of the feature quantities "current: 2.3, voltage:

1.2, vibration: 1.0". The cell ID "10232" is managed in association with "current: 2.3, voltage: 1.2, vibration: 1.0" as sensor data in process X. Similarly, each cell ID is also associated with the feature quantities (numerical values) applied in each of processes Y and Z.

Such management of the data group D1 may be performed by an external management server or may be performed by classification system 1 (processor 100). The management server (or processor 100) receives a detection value (electrical signal) as sensor data from one or plurality of sensors in each process, and manages the detection value in association with the cell ID. It is desirable that the data group D1 is displayed on a display screen of a thin display device such as a liquid crystal display or an organic EL display (or a display screen of a smartphone, a tablet terminal, or the like), and can be viewed by a setting person (person).

Further, the management server (or processor 100) receives image data (inspection image) captured by imaging device 3 and a file number thereof, and manages the image data and the file number as parts of the data group D1 in association with the cell ID. It is desirable that the setting person can visually perform the above-described work of labeling a plurality of pieces of image data having a defect with any one (or a plurality) of the defect type "A", the defect type "B", and the defect type "C" through a mouse operation or the like while viewing the data group D1 on the display device.

In FIG. 5, the part of each feature quantity (numerical value) may vary depending on the type of actually used production facility, and thus is omitted here.

Then, the setting person (person) creates the second model while visually referring to the data group D1. The setting person associates a data distribution of a cluster of numerical values of the feature quantities (nine types of the feature quantities in total) related to all cell IDs of image data determined as the defect type "A" in the data group D1 with the defect type "A". That is, the cluster of the numerical values of the feature quantities is specified as a specified region R0 in a feature quantity space SP1 (see FIG. 6) regarding the manufacturing conditions. In other words, the second classification result includes the plurality of specified regions R0 associated with the plurality of second classes C2 in the feature quantity space SP1 regarding the manufacturing conditions.

In FIG. 6, for convenience of description, the feature quantity space SP1 is represented by a two-dimensional (horizontal axis and vertical axis) graph for easier understanding. For example, in FIG. 6, any one (for example, "current") of nine types of the feature quantities (current, voltage, vibration . . . ) is applied to the X axis (horizontal axis), and any another one (for example, "voltage") is applied to the Y axis (vertical axis). However, in practice, the number of dimensions of the feature quantity space SP1 is "9" when all nine types of the feature quantities (current, voltage, vibration . . . ) are considered. That is, the second model is created as a nine-dimensional feature quantity space SP1, and a plurality of specified regions R0 respectively associated with a plurality of second classes C2 is specified in the feature quantity space SP1. Data regarding the second model is input from second input part 32, for example.

For example, data of numerical values "1.2" and "0.9" . . . of "voltage" in process X with respect to numerical values "2.3" and "4.2" . . . of "current" in process X of the cell IDs "10232" and "10508" . . . in which the image data related to the defect type "A" is reflected in the feature quantity space SP1. As a result, the data distribution of a certain extent forms one cluster region. This region is specified as a first specified region R1 associated with the defect type "A" linked to "class 1". In other words, in a case where a large number of pieces of data regarding "current" versus "voltage" of object 2 associated with the defect type "A" are indicated by points (plots), a region formed as one cluster region is specified as a first specified region R1. In the example of FIG. 6, the first specified region R1 is an elliptical region that is long along the Y axis. Here, the setting person determines a position (X-Y coordinate) of a center A1 (or the center of gravity) of the first specified region R1.

Although detailed description is omitted, similarly, in a case where a large number of pieces of data regarding "current" versus "voltage" of object 2 associated with the defect type "B" are indicated by plots, a region formed as one cluster region is specified as a second specified region R2 that has an elliptical shape and is long along the X axis (see FIG. 6). Further, in a case where a large number of pieces of data regarding "current" versus "voltage" of object 2 associated with the defect type "C" are indicated by plots, a region formed as one cluster region is specified as a third specified region R3 having a slightly small elliptical shape (see FIG. 6). The setting person determines also a position of a center A2 of the second specified region R2, and a position of a center A3 of the third specified region R3.

In the example of FIG. 6, the number of dimensions of the feature quantity space SP1 is "2". However, even when the number of dimensions of the feature quantity space SP1 is actually increased to "9", the number of the specified regions R0 is three, which is equal to the number of second classes C2 (the number of defect types). However, for example, the specified region R0 may be divided for each process. Three specified regions R0 associated with the defect types "A" to "C" may be set in process X (three kinds of feature quantities), and similarly, three specified regions R0 may be set in each of processes Y and Z (that is, the number of the specified regions R0 is nine).

Second model storage part P2 stores a second model. Second model storage part P2 includes one or more storage devices. The storage device is, for example, a RAM or an EEPROM. Second model storage part P2 is provided outside processor 100, but may correspond to a memory incorporated in processor 100. Although second model storage part P2 and first model storage part P1 are provided separately, one storage part may be commonly used.

(2.5) Processor

Processor 100 will be described below.

Processor 100 is configured to generally control classification system 1, that is, first input part 31, second input part 32, output part 33, first model storage part P1, and second model storage part P2. Processor 100 is achieved by, for example, a computer system including one or more processors (microprocessors) and one or more memories. That is, one or more processors execute one or more programs (applications) stored in one or more memories to function as processor 100. The program is, herein, recorded in advance in the memory of processor 100. Alternatively, the program may be provided via a telecommunication line such as the Internet or by being recorded in a non-transitory recording medium such as a memory card.

As illustrated in FIG. 1, processor 100 includes learning part 10, determination part 13, and notification part 14. In other words, processor 100 has a function as learning part 10, a function as determination part 13, and a function as notification part 14.

Learning part 10 executes a learning method for generating a learned model (first model that is first classification part 11) that determines image data. That is, learning part 10 mainly performs processing related to a learning phase. In the learning method, a plurality of pieces of image data is used. As described above, learning part 10 generates the first model through supervised learning. That is, learning part 10 creates the first model through machine learning using data in which the setting person labels a plurality of pieces of image data "determined as NG" in advance with one of (or a plurality of) the defect types "A" to "C". That is, the image M1 of object 2 is used as a learning image. The learning image may include, as the "reference image" data, not only the image M1 of object 2 having a defect "determined as NG" as illustrated in FIGS. 2A to 2C but also the image of object 2 having no defect "determined as OK".

Determination part 13 mainly executes processing related to the application phase using the learned model (first model) or the like. Determination part 13 is configured to determine whether to use one or both of a first classification result obtained by first classification part 11 and a second classification result obtained by second classification part 12. Determination part 13 is configured to determine the class of object 2 based on one or both of the determined classification results.

Here, as an example, determination part 13 is required to use the first classification result. That is, determination part 13 uses the image data of object 2 (object 2 of interest) to be subjected to the class determination as a main material for the class determination, and uses the manufacturing data of object 2 as an auxiliary material for the class determination. Therefore, determination part 13 executes first determination processing for determining the class of object 2 based on the first classification result and second determination processing for determining the class of object 2 additionally in consideration of the second classification result when the determination is difficult only with the first classification result.

Notification part 14 corresponds to functional part 6 that executes predetermined processing in accordance with the determination result in determination part 13. In other words, classification system 1 (processor 100) further includes functional part 6. Here, as an example, the predetermined processing of functional part 6 includes notification processing. Functional part 6 (notification part 14) notifies a user (for example, an inspector of object 2) of the determination result through, for example, screen display on the image display device in output part 33, a voice message or a notification sound (including an alarm sound and the like) from a speaker, or both the screen display and the speaker output.

The predetermined processing of functional part 6 is not limited only to only the notification processing. Here, learning part 10 also corresponds to functional part 6. The predetermined processing of functional part 6 (learning part 10) further includes processing for reflecting the determination result of determination part 13 in at least one of the first model and the second model. Here, as an example, learning part 10 performs relearning of the first model using the determination result of determination part 13.

Note that the predetermined processing of functional part 6 may include processing for providing information to the outside. Furthermore, for example, the predetermined processing of functional part 6 may include feedback control processing for transmitting a control signal to a control system in the production facility of the manufacturing line, based on the determination result of determination part 13.

[Determination Processing]

In the present exemplary embodiment, the image data is assumed to have higher reliability than the manufacturing data, and basically, a determination result based on the image data is prioritized. Therefore, determination part 13 first refers to the first model (first classification part 11) in first model storage part P1, and determines which class object 2 is associated with, based on the image data to be subjected to the class determination. That is, determination part 13 first determines the class of object 2 by using the first classification result. However, in a case where the first classification result has uncertainty related to the class determination for object 2, determination part 13 determines the class of the object 2 using the second classification result.

The description will be given first with reference to FIG. 7A. "One" defect 5 (curved recess 52) having a comparatively large size occurs in object 2 in "image 1" of FIG. 7A. Determination part 13 uses the first model to determine that defect 5 does not match the defect type "A" and the defect type "C" and matches the defect type "B". In FIGS. 7A to 7C, mark "○" means "match", and mark "x" means "mismatch".

Figure 4A:
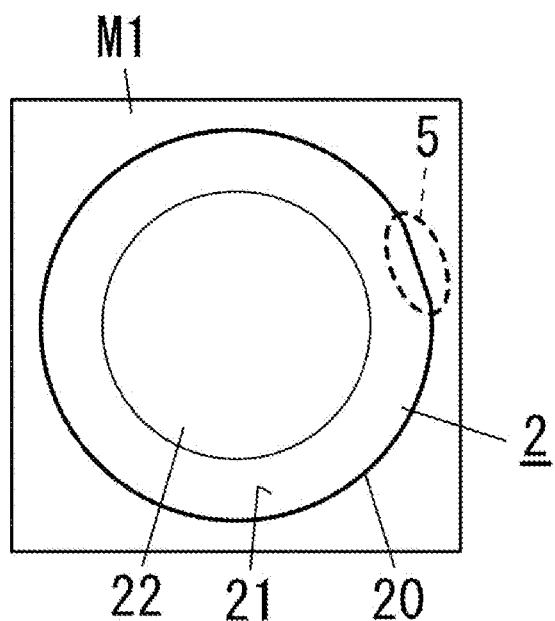
FIG. 4A is a diagram illustrating an example of the image data of the object.
Figure 4B:
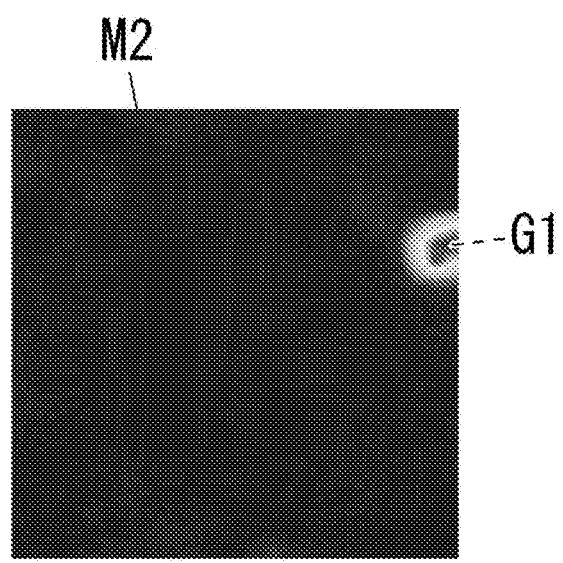
FIG. 4B is a conceptual diagram of a heat map regarding the object of FIG. 4A.

Here, a determination on the occurrence position (spatial position) of defect 5 will be described. For example, determination part 13 recognizes the spatial position of defect 5 through a heat map using the technology of Gradient-weighted Class Activation Mapping (Grad-CAM). FIG. 4A illustrates the image M1 of object 2 having defect 5, and FIG. 4B illustrates the image M2 that is a heat map of object 2 in FIG. 4A. In the image M2, a range G1 of defect 5 monitored by determination part 13 is displayed in a color map (illustrated in gray scale in FIG. 4B). Determination part 13 recognizes a spatial position and a number of defect 5 through coordinates on the heat map.

Therefore, in the case of the "image 1" in FIG. 7A, determination part 13 recognizes the spatial position of defect 5 (the upper right of edge portion 20) and the number of defect 5 (one) through the heat map.

In a case where the number of defect 5 is one in the first determination processing, determination part 13 does not execute the second determination processing. In short, at this point of time, the class of object 2 is defined as "class 2" as the classification category to which the defect type "B" is linked. Processor 100 causes output part 33 to output a fact that object 2 in the "image 1" falls under "class 2".

The description will be given below with reference to FIG. 7B. "Two" defects 5 occur in object 2 in the "image 2" in FIG. 7B. Two defects 5 are curved recess 52 and linear flaw 53, respectively. Determination part 13 uses the first model to determine that two defects 5 match the defect type "B" and the defect type "C" but do not match the defect type "A". In particular, as described above, determination part 13 recognizes the spatial position of curved recess 52 (upper right of edge portion 20), the spatial position of linear flaw 53 (lower left of bottom surface 22), and the number of defects 5 (two) through the heat map. That is, determination part 13 recognizes that the spatial positions of two defects 5 are different from each other.

In a case where a plurality of defects 5 is present and their spatial positions are different in the first determination processing, determination part 13 does not execute the second determination processing. In short, at this point of time, the class of object 2 is defined as "class 2" and "class 3" as the classification categories to which the defect type "B" and the defect type "C" are linked. Processor 100 causes output part 33 to output a fact that object 2 in the "image 2" falls under "class 2" and "class 3".

In short, determination part 13 of the present exemplary embodiment determines the class of object 2 without using the second classification result when the first classification result satisfies a predetermined specifying condition. The "predetermined specifying condition" mentioned here is, for example, "the number of defect 5 is one" or "defects 5 are not present in the same spatial position when the plurality of defects 5 is present". Furthermore, as described above, in the present exemplary embodiment, determination part 13 determines the class of object 2 further using the information about the (spatial) position of one or a plurality of events (here, defects 5) in the image data.

The description will be further given with reference to FIG. 7C. Object 2 in an "image 3" in FIG. 7C has one small defect 5 at a glance. As described with reference to FIG. 3, the "image 3" is the image of object 2 having comparatively small defect 5. Therefore, in the example of FIG. 7C, determination part 13 determines that the number of defects 5 is two (flat recess 51 and curved recess 52) in the class determination using only the image data. As a result, determination part 13 determines that one defect 5 matches the defect type "A" and the defect type "B". However, determination part 13 also recognizes that flat recess 51 and curved recess 52 are in the same spatial position through the heat map.

In the "image 3" of FIG. 7C, the above-described "predetermined specifying condition" is not satisfied, and determination part 13 executes the second determination processing. In other words, it can be said that one of the "uncertainties" is that "the predetermined specifying condition is not satisfied". By executing the second determination processing when uncertainty is present, the possibility of finding a classification error or the like in the first classification result can be increased.

Determination part 13 refers to the second model in second model storage part P2 to determine whether defect 5 falls under the defect type "A" or the defect type "B" in the second determining processing. That is, in the second determination processing, determination part 13 does not determine one second class from three second classes C2 ("class 1" to "class 3"). Determination part 13 determines one of the two second classes C2 ("class 1" and "class 2") in consideration of the determination result in the first determination processing. Here, as illustrated in FIG. 7C, the two second classes C2 ("class 1" and "class 2") match the two first classes C1 ("class 1" and "class 2").

Specifically, when using the second classification result, determination part 13 determines the class of object 2 based on a distance L0 (see FIG. 6) from the feature quantity of the second target data in the feature quantity space SP1 to each of the plurality of specified regions R0. However, as described above, determination part 13 has already narrowed down the second classes C2 to two. Therefore, determination part 13 focuses on the first specified region R1 and the second specified region R2 associated with "class 1" and "class 2", that is, the defect type "A" and the defect type "B", respectively, among three specified regions R0. Determination part 13 calculates the distances L0 to the center A1 of the first specified region R1 and the center A2 of the second specified region R2 from manufacturing data K1 of object 2 to be subjected to the class determination. In the example of FIG. 6, since the feature quantity space SP1 is described two-dimensionally as described above, the manufacturing data K1 is data related to two feature quantities including a current value I1 and a voltage value V1. Determination part 13 then compares the two distances L0 with each other, and determines that the defect type associated with the specified region R0 having the shorter distance L0 is the defect type of object 2 of interest. The reliability regarding the class determination for object 2 can be further improved by making the determination based on the distance L0 in this manner.

In the examples of FIGS. 6 and 7C, the distance from the manufacturing data K1 to the center A1 of the first specified region R1 is shorter than the distance from the manufacturing data K1 to the center A2 of the second specified region R2. Therefore, determination part 13 determines that the defect type "A" associated with the first specified region R1 is the defect type of object 2 in the "image 3". That is, the class of object 2 is specified as "class 1" linked to the defect type "A" through the determination based on the manufacturing data (sensor data). Processor 100 causes output part 33 to output a fact that object 2 in the "image 3" falls under "class 1".

In particular, in this case, there is a possibility of insufficient learning of the first model. Learning part 10 associates the image data determined as the defect type "A" and the defect type "B" in the first determination processing with the defect type "A" that is the determination result in the second determination processing, and adds the image data as teacher data. That is, learning part 10 performs relearning of the first model using the determination result of determination part 13.

[Description of Operation]

The operation of the determination processing in determination part 13 described above will be briefly described below with reference to the flowchart illustrated in FIG. 8. Note that, although not described here, in a case where the number of defect 5 is zero (0) in the first determination processing, processor 100 causes output part 33 to output a determination result indicating that object 2 of interest is normal.

Determination part 13 determines whether the number of defect types (the number of defects) is two or more for the image data of object 2 of interest (step S1). When the number of the defect types is one (step S1: No), output part 33 outputs a class specified in the first determination processing as a determination result (step S4).

On the other hand, when the number of the defect types is two or more (step S1: Yes), determination part 13 determines whether determination grounds (two or more defect types) are in the same spatial position (step S2). When the determination grounds are different spatial positions (step S2: No), output part 33 outputs a class specified in the first determination processing as a determination result (step S4).

When the determination grounds are the same spatial position (step S2: Yes), determination part 13 executes the second determination processing and determines the class of object 2 of interest based on the distance L0 in the feature quantity space SP1 (step S3). Output part 33 then outputs the class specified in the second determination processing as a determination result (step S4).

As described above, the first classification result may indicate the result of classification into two or more first classes C1. If two or more events (defects 5) associated with two or more first classes C1 are in one position, determination part 13 determines the class of object 2 using the second classification result. Further, when the two or more events (defects 5) associated with the two or more first classes C1 are in different positions, determination part 13 determines the class of object 2 without using the second classification result.

[Advantages]

As described above, in classification system 1 according to the present exemplary embodiment, determination part 13 decides whether to use one or both of the first classification result and the second classification result, and determines a class of object 2 based on the one or both of them. That is, the class determination for object 2 may be made based on both the first classification result and the second classification result as necessary. Therefore, it is possible to improve the reliability regarding the class determination for object 2 as compared with a case of determining the class of object 2 based only on the image data or only on the manufacturing data.

In addition, since the plurality of first classes C1 and the plurality of second classes C2 are set to match each other, the reliability regarding the class determination for object 2 can be further improved as compared with a case where different classes are mixed in the plurality of first classes C1 and the plurality of second classes C2.

Further, determination part 13 determines the class of object 2 without using the second classification result when the first classification result satisfies a predetermined specifying condition. That is, determination part 13 does not execute the second determination processing in some cases. Therefore, a processing load related to the class determination can be reduced. In addition, for example, the inspection time of object 2 is shortened.

Furthermore, determination part 13 determines the class of object 2 further using the information about the position of defect 5 in the image data. As a result, the reliability regarding the class determination for object 2 can be further improved. In particular, when two or more defects 5 are in one position, the class of object 2 is determined by using the second classification result. When the two or more defects 5 are in different positions, the class of object 2 is determined without using the second classification result. Therefore, the reliability regarding the class determination for object 2 can be further improved, and the processing load regarding the class determination can be reduced when the two or more events are in different positions.

(3) Modifications

The above exemplary embodiment is merely one of various exemplary embodiments of the present disclosure. The above exemplary embodiment can be variously changed according to design and the like as long as the object of the present disclosure can be achieved. In addition, functions similar to those of classification system 1 according to the above-described exemplary embodiment may be embodied by a classification method, a computer program, a non-transitory recording medium recording a computer program, or the like.

Specifically, a classification method according to one aspect includes a first classification step, a second classification step, and a determination step. In the first classification step, the first target data is classified into at least one of a plurality of first classes C1. In the second classification step, the second target data is classified into at least one of a plurality of second classes C2. In the determination step, a decision is made whether to use one or both of a first classification result that is a classification result obtained in the first classification step and a second classification result that is a classification result obtained in the second classification step, and a class of an object is determined based on the one or both of them. The first target data is image data of object 2. The second target data is manufacturing data regarding a manufacturing condition of object 2.

Modifications of the exemplary embodiment will be listed below. Modifications described below can be appropriately combined and applied. Hereinafter, the exemplary embodiment may be referred to as a "basic example".

Classification system 1 of the present disclosure includes a computer system. The computer system mainly includes a processor and a memory as hardware. The processor executes a program recorded in the memory of the computer system to implement a function as classification system 1 of the present disclosure. The program may be recorded in advance in the memory of the computer system, may be provided through a telecommunication line, or may be provided by being recorded in a non-transitory recording medium readable by the computer system, such as a memory card, an optical disk, or a hard disk drive. The processor of the computer system includes one or a plurality of electronic circuits including a semiconductor integrated circuit (IC) or a large-scale integration (LSI). The integrated circuit such as the IC or the LSI in this disclosure is called differently depending on a degree of integration, and includes an integrated circuit called a system LSI, a very large scale integration (VLSI), or an ultra large scale integration (VLSI). Furthermore, a field programmable gate array (FPGA) programmed after manufacture of an LSI, or a logical device capable of reconfiguring a joint relationship inside an LSI or reconfiguring circuit partitions inside the LSI can also be used as the processor. The plurality of electronic circuits may be integrated into one chip or may be provided in a distributed manner on a plurality of chips. The plurality of chips may be aggregated in one device or may be provided in a distributed manner in a plurality of devices. The computer system in this disclosure includes a microcontroller having one or more processors and one or more memories. Therefore, the microcontroller is also constituted by one or a plurality of electronic circuits including a semiconductor integrated circuit or a large-scale integrated circuit.

In addition, integration of a plurality of functions in classification system 1 into one housing is not essential. For example, the components of classification system 1 may be distributed in a plurality of housings. On the contrary, multiple functions in classification system 1 may be aggregated in one housing. Further, at least some of functions of classification system 1, for example, some functions of classification system 1 may be achieved by a cloud (cloud computing) or the like.

(3.1) First Modification

Figure 11:
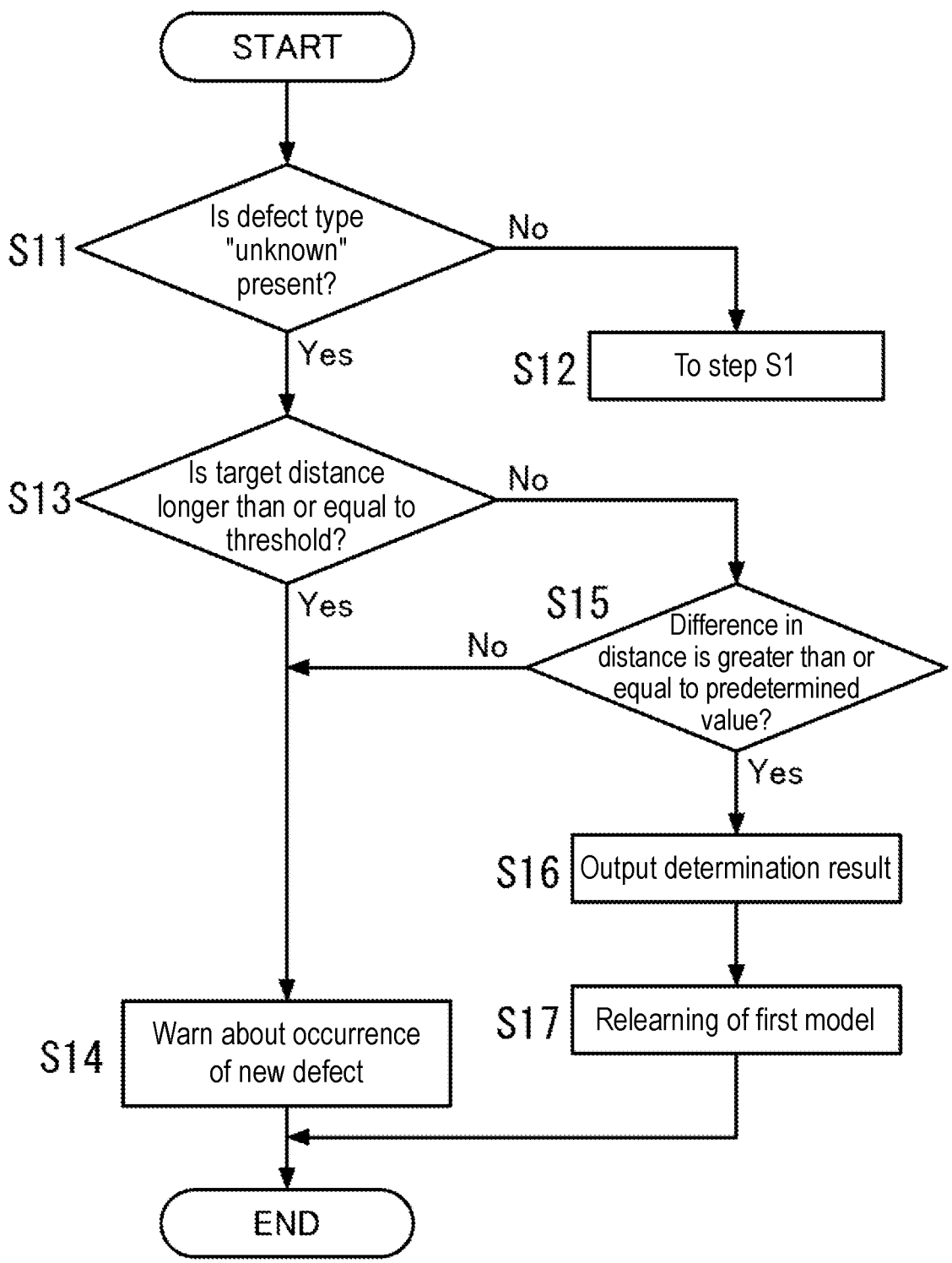
FIG. 11 is a flowchart regarding an operation in the first modification.

Hereinafter, a modification (first modification) of classification system 1 will be described with reference to FIGS. 9 to 11. In the following present modification, components substantially common to classification system 1 of the basic example are denoted by the same reference numerals, and the description thereof may be appropriately omitted.

Figures 9, 10:
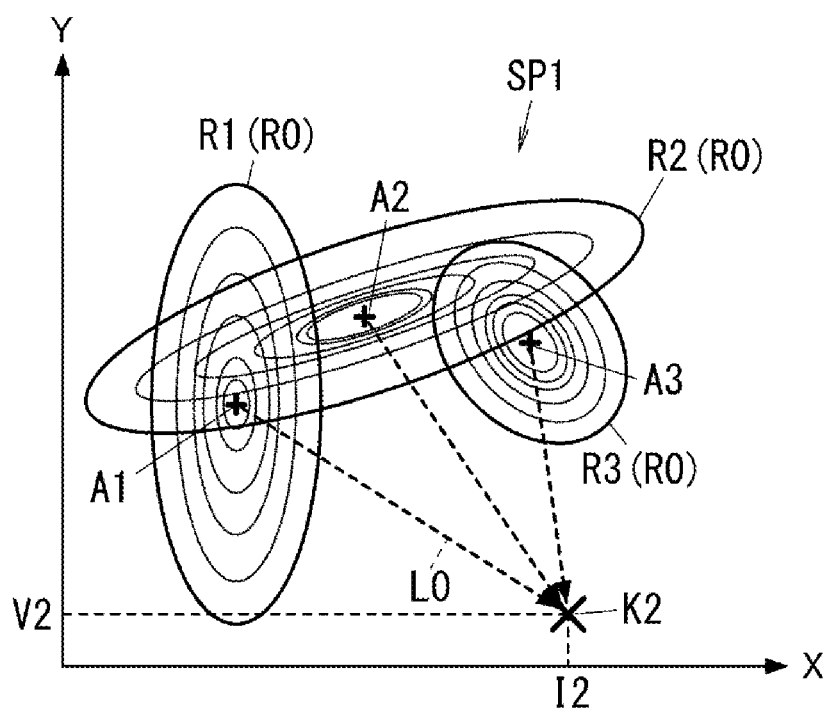
FIG. 9 is an explanatory diagram regarding image data of a new defect in the classification system according to a first modification.
FIG. 10 is a diagram for describing an operation according to the first modification and a conceptual diagram regarding the second model.

FIG. 9 is an explanatory diagram regarding image data of a new defect in a first modification of classification system 1. FIG. 10 is a diagram for describing an operation of classification system 1 according to the first modification and a conceptual diagram regarding the second model. FIG. 11 is a flowchart regarding the operation of classification system 1 according to the first modification. While determination part 13 is executing processing related to an application phase using the first model (first determination processing), a new (unknown) defect that has not been learned by the first model may be found. For example, defect 5 distorted into an elliptical shape as a whole occurs in object 2 of an "image 4" illustrated in FIG. 9. When such defect 5 has never occurred in the past, an associated defect type is likely not to be set as the teacher data.

Therefore, in the present modification, as illustrated in FIG. 9, the plurality of first classes C1 further includes "others" as a classification category linked to a defect type "unknown".

If determination part 13 of the present modification determines that defect 5 exists at least in the image data in the first determination processing and determines that defect 5 does not fall under any of the defect types "A" to "C", it determines that defect 5 falls under the defect type "unknown".

Here, determination part 13 of the basic example makes the class determination without using the second classification result when the first classification result satisfies the "predetermined specifying condition" (the number of defect 5 is one, or the plurality of defects 5 is not present at the same spatial position). However, when defect 5 of the defect type "unknown" exists, determination part 13 of the present modification exceptionally executes the second determination processing regardless of the number and the spatial position of defect 5. That is, defect 5 of the defect type "unknown" can be said to be one of "uncertainties".

Specifically, for example, even if the number of defect 5 is only one (defect 5 of the defect type "unknown"), determination part 13 of the present modification executes the second determination processing. In addition, for example, even when defect 5 of the defect type "A" exists in addition to defect 5 of the defect type "unknown" and these defects exist in different spatial positions, determination part 13 of the present modification executes the second determination processing.

There are the following two reasons for executing the second determination processing regardless of the number and spatial position of defect 5 when defect 5 of the defect type "unknown" exists.

As a first reason, defect 5 of the defect type "unknown" is likely to be actually new defect 5 as described above. As a second reason, actually, a defect that should fall under any one of the defect types "A" to "C" is likely to be erroneously determined as the defect type "unknown" due to insufficient learning of the first model.

In the second determination processing, determination part 13 of the present modification focuses on all the three specified regions R0 (see FIG. 10). Determination part 13 of the present modification calculates the distances L0 to the centers of the three specified regions R0 from the manufacturing data K2 of object 2 to be subjected to the class determination as illustrated in FIG. 10. Also in the example of FIG. 10, as in FIG. 6, for convenience of description, the feature quantity space SP1 is represented by a two-dimensional graph, and the manufacturing data K2 is data regarding two feature quantities including a current value I2 and a voltage value V2 as an example.

Here, determination part 13 of the present modification determines whether the shortest distance L0 (hereinafter, referred to as a "target distance L0") among the three distances L0 to the centers A1 to A3 of the three specified regions R0 is greater than or equal to a threshold or less than the threshold. When the target distance L0 is greater than or equal to the threshold, that is, when the manufacturing data K2 is comparatively far from the center of any specified region R0, determination part 13 determines that defect 5 of the defect type "unknown" determined in the first determination processing is a "new defect". In this case, since the result does not fall under any of "class 1" to "class 3", determination part 13 of the present modification does not cause output part 33 to output the result as the determination result of the class. Alternatively, notification part 14 of the present modification notifies a user (for example, an inspector of object 2) of the occurrence of a new defect through, for example, screen display on the image display device in output part 33, output of a voice message or an alarm sound from a speaker, or both the screen display and the speaker output.

When the target distance L0 is less than the threshold and the difference between the target distance L0 and another distance L0 is greater than or equal to a predetermined value, determination part 13 of the present modification determines that the defect type related to the specified region R0 of the target distance L0 is the defect type of object 2. That is, determination part 13 determines the defect as the defect type "unknown" in the first determination processing. However, when determining that the manufacturing data K2 is particularly close to the specified region R0 related to one of the defect types "A" to "C" in the second determination processing, determination part 13 determines that the defect falls under that defect type. Therefore, the class of object 2 is specified as a class (for example, "class 1") linked to that defect type (for example, the defect type "A") through the determination based on the manufacturing data. Processor 100 causes output part 33 to output a fact that object 2 falls under "class 1".

In particular, in this case, there is a possibility of insufficient learning of the first model as described in the second reason. Learning part 10 thus associates the image data determined as the defect type "unknown" in the first determination processing with the defect type "A" that is the determination result in the second determination processing, and adds the image data as teacher data. That is, learning part 10 performs relearning of the first model using the determination result of determination part 13.

There may be a case where the manufacturing data K2 is close to the specified region R0 related to two or more defect types among the defect types "A" to "C". When the target distance L0 is less than the threshold and the difference between the target distance L0 and another distance L0 is less than the predetermined value, determination part 13 of the present modification determines the class as two or more defect types related to the specified region R0 of the distance L0. In this case, since two or more classes exist and inconsistency is difficulty maintained, determination part 13 does not cause output part 33 to output the determination result of the class. Alternatively, notification part 14 notifies a user of the likeliness of the occurrence of a new defect through screen display on the image display device in output part 33, output of a voice message or an alarm sound from a speaker, or both the screen display and the speaker output.

[Description of Operation]

The operation of the determination processing in determination part 13 of the present modification described above will be briefly described below with reference to the flowchart illustrated in FIG. 11.

Determination part 13 determines whether the defect type "unknown" exists in the image data of object 2 of interest (step S11). When the defect type "unknown" does not exist (step S11: No), similarly to the basic example, a determination is made whether to output the determined defect type as it is as a determination result or to execute the second determination processing (step S12: to step S1 in FIG. 8).

On the other hand, when the defect type "unknown" exists (step S11: Yes), determination part 13 makes comparison and determination between the target distance L0 and a threshold (step S13). When the target distance L0 is greater than or equal to the threshold (step S13: Yes), notification part 14 warns the user about the occurrence of a new defect (step S14).

When the target distance L0 is less than the threshold (step S13: No), determination part 13 makes comparison and determination between a difference between the target distance L0 and another distance L0 and a predetermined value (step S15). When the difference is greater than or equal to the predetermined value (step S15: Yes), determination part 13 determines the defect type related to the target distance L0 and outputs the determination result (step S16). Further, learning part 10 executes relearning of the first model (step S17). When the difference is less than the predetermined value (step S15: No), determination part 13 warns the user about the occurrence of a new defect (step S14).

This configuration can improve the reliability regarding the class determination for object 2 even if new defect 5 occurs. In addition, insufficient learning of the first model can also be decreased. In particular, in a case where new defect 5 occurs, this case is notified to the user, thus reducing the possibility of overlooking the occurrence of new defect 5.

(3.2) Second Modification

Hereinafter, a modification (second modification) of classification system 1 will be described with reference to FIG. 12. In the following present modification, components substantially common to classification system 1 of the basic example are denoted by the same reference numerals, and the description thereof may be appropriately omitted.

In the first modification, determination part 13 recognizes the presence of defect 5 of the defect type "unknown" in the first determination processing, and then can determine whether defect 5 is new in the second determination processing. Determination part 13 of the present modification is configured to recognize the presence of the defect type "unknown" in the second determination processing even if the presence is not recognized in the first determination processing.

The following will describe a case where determination part 13 of the present modification determines that defects of two or more defect types (for example, two defect types "A" and "B") are in the same spatial position in the first determination processing and executes the second determination processing.

Here, determination part 13 of the basic example narrows down the specified regions only to the first specified region R1 and the second specified region R2 related to the defect types "A" and "B" determined in the first determination processing, and compares the two distances L0. However, determination part 13 of the present modification is different from the basic example in that the shortest target distance L0 is determined in all the specified regions R0.

When the defect types "A" and "B" are in the same spatial position, determination part 13 of the present modification first makes comparison and determination between the target distance L0 and a threshold. When the target distance L0 is greater than or equal to the threshold, determination part 13 determines that the defect type is "unknown". However, unlike the first modification, determination part 13 does not determine the defect as a "new defect", but trusts the defect types "A" and "B" determined in the first determination processing. Determination part 13 determines the defect type related to the specified region R0 having the shorter distance L0 among the defect types "A" and "B", and outputs a determination result.

On the other hand, when the target distance L0 is less than the threshold, determination part 13 of the present modification then makes comparison and determination between a difference between the target distance L0 and another distance L0 and a predetermined value. When the difference between the target distance L0 and another distance L0 is greater than or equal to a predetermined value, the defect type is determined to be (one) defect type related to the target distance L0, and the determination result is output. Further, since the determination based on the image data is likely to be wrong due to insufficient learning of the first model, learning part 10 executes relearning of the first model using the determination result of determination part 13.

When the difference is less than the predetermined value, determination part 13 determines two or more defect types related to the specified region R0 of the distance L0. Further, determination part 13 compares whether two or more defect types determined based on the manufacturing data (sensor data) all match the defect types "A" and "B" determined based on the image data. When all the defect types match, determination part 13 outputs the determination result as it is. However, when they do not match, for example, when the determination based on the manufacturing data is the defect types "A" and "C" and the determination based on the image data is the defect types "A" and "B", determination part 13 determines the matching defect type "A" and outputs the determination result. When all the defect types do not match, determination part 13 trusts the defect types "A" and "B" determined in the first determination processing and outputs the determination result.

[Description of Operation]

FIG. 12 is a flowchart regarding the operation of classification system 1 according to the second modification.

The operation of the determination processing in determination part 13 of the present modification described above will be briefly described below with reference to the flowchart illustrated in FIG. 12.

Determination part 13 determines whether the determination grounds (two or more defect types) of the image data of object 2 of interest are in the same spatial position (step S21: corresponding to "Yes" in step S2 in FIG. 8 in the basic example).

When the determination grounds are in the same spatial position (step S21: Yes), determination part 13 executes the second determination processing to make comparison and determination between the distance L0 and the threshold (step S22). When the determination grounds are not in the same spatial position (step S21: No), a determination result is output as it is (step S24).

When the target distance L0 is greater than or equal to the threshold (step S22: Yes), notification part 14 gives priority to two or more defect types determined in the first determination processing (image data) (step S23). For example, determination part 13 determines any one of the defect types and outputs the determination result (step S24).

When the target distance L0 is less than the threshold (step S22: No), determination part 13 makes comparison and determination between a difference between the target distance L0 and another distance L0 and a predetermined value (step S25). When the difference is greater than or equal to the predetermined value (step S25: Yes), determination part 13 determines the defect type related to the target distance L0 and outputs the determination result (step S26). Further, learning part 10 executes relearning of the first model (step S27).

When the difference is less than the predetermined value (step S25: No), determination part 13 compares whether at least one matching defect type exists between two or more defect types based on the manufacturing data and two or more defect types based on the image data (step S28). When at least one matching defect type exists (step S28: Yes), determination part 13 determines a class of the matching defect type and outputs the determination result (step S24). When all the defect types do not match (step S28: No), determination part 13 gives priority to the determination based on the image data (step S23) and outputs the determination result (step S24).

This configuration can further improve the reliability regarding the class determination for object 2. In addition, insufficient learning of the first model can also be decreased.

(3.3) Other Modifications

In the basic example, the class to be determined is defined by a "defect (failure)" that may occur in object 2 as an example. However, the class to be determined is not limited to "defect", and may be defined by, for example, the degree of quality (excellent, good, ordinary, etc.) of object 2.

In the basic example, the first model is a learned model, but may not be a learned model. In the basic example, the second model is not a learned model, but may be a learned model.

In the basic example, the determination based on the image data (first determination processing) is made before the determination based on the manufacturing data (second determination processing), but conversely, the determination based on the manufacturing data may be performed first.

In the basic example, when the number of defects is zero (0) in the determination based on the image data (first determination processing), determination part 13 outputs the determination result indicating normality as it is without executing the determination based on the manufacturing data (second determination processing). However, determination part 13 may execute the second determination processing even when the number of a defect is zero (0) in the determination based on the image data (first determination processing). Further, when the determination indicates normality, the determination result may not be output.

In the first modification and the second modification, only one threshold is used, but the threshold may be set in a plurality of stages.

(4) Conclusion

As described above, classification system (1) according to a first aspect includes first classification part (11), second classification part (12), and determination part (13). First classification part (11) classifies first target data into at least one of a plurality of first classes (C1). Second classification part (12) classifies second target data into at least one of a plurality of second classes (C2). Determination part (13) decides whether to use one or both of a first classification result that is a classification result obtained by first classification part (11) and a second classification result that is a classification result obtained by second classification part (12), and determines a class of object (2) based on the one or both of them. The first target data is image data of object (2). The second target data is manufacturing data regarding a manufacturing condition of object (2). The first aspect can improve reliability regarding a class determination for object (2).

In classification system (1) according to a second aspect, in the first aspect, a plurality of first classes (C1) and a plurality of second classes (C2) match each other. According to the second aspect, the reliability regarding the class determination for object (2) can be further improved as compared with a case where different classes are mixed in the plurality of first classes (C1) and the plurality of second classes (C2).

In classification system (1) according to a third aspect, in the first aspect or the second aspect, determination part (13) determines the class of object (2) without using the second classification result when the first classification result satisfies a predetermined specifying condition. According to the third aspect, a processing load regarding the class determination can be reduced.

In classification system (1) according to a fourth aspect, in any one of the first to third aspects, first classification part (11) performs classification based on a type of one or a plurality of events occurring in object (2) in image data. Determination part (13) determines the class of object (2) further using the information about the position of one or a plurality of events in the image data. The fourth aspect can further improve the reliability regarding the class determination for object (2).

In classification system (1) according to a fifth aspect, in the fourth aspect, when the first classification result indicates a result of classification into two or more first classes (C1), determination part (13) makes a determination as follows. That is, when two or more events associated with two or more first classes (C1) are in one position, determination part (13) determines the class of object (2) using the second classification result. Further, when the two or more events associated with two or more first classes (C1) are in different positions, determination part (13) determines the class of object (2) without using the second classification result. The fifth aspect can further improve the reliability regarding the class determination for object (2) when the two or more events are in one position. In addition, when the two or more events are in different positions, a processing load regarding the class determination can be reduced.

In classification system (1) according to a sixth aspect, in any one of the first to fifth aspects, the second classification result includes a plurality of specified regions (R0) respectively related to a plurality of second classes (C2) in the feature quantity space (SP1) related to manufacturing conditions. When using the second classification result, determination part (13) determines the class of object (2) based on the distances (L0) from the feature quantity of the second target data in the feature quantity space (SP1) to the plurality of specified regions (R0). The sixth aspect can further improve the reliability regarding the class determination for object (2).

In classification system (1) according to a seventh aspect, in any one of the first to sixth aspects, determination part (13) determines the class of object (2) using the first classification result. When the first classification result has uncertainty related to the class determination for object (2), determination part (13) determines the class of object 2 using the second classification result. The seventh aspect, for example, can increase the possibility of finding a classification error in the first classification result. In addition, the possibility of finding a new class (for example, a new defect or the like) can be increased.

Classification system (1) according to an eighth aspect further includes functional part (6) that executes predetermined processing in accordance with a determination result in determination part (13) using the second classification result in the seventh aspect. The eighth aspect can improve applicability regarding the determination result in determination part (13). For example, when the predetermined processing includes notification processing, the determination result can be notified to the person.

In classification system (1) according to a ninth aspect, in any one of the first to eighth aspects, the plurality of first classes (C1) and the plurality of second classes (C2) are defined by a defect of object (2). The ninth aspect can further improve the reliability regarding a defect determination for object (2).

In classification system (1) according to a tenth aspect, in any one of the first to ninth aspects, first classification part (11) is a learned model that has learned the plurality of first classes (C1) in the image data. The tenth aspect can further improve reliability regarding classification in first classification part (11), thus further improving the reliability regarding the class determination for object (2).

In classification system (1) according to an eleventh aspect, in any one of the first to tenth aspects, second classification part (12) is a model in which the plurality of second classes (C2) is respectively associated with data distributions of the feature quantities related to the manufacturing conditions. The eleventh aspect can further improve reliability regarding classification in second classification part (12), thus further improving the reliability regarding the class determination for object (2).

A classification method according to a twelfth aspect includes a first classification step, a second classification step, and a determination step. In the first classification step, first target data is classified into at least one of a plurality of first classes (C1). In the second classification step, second target data is classified into at least one of a plurality of second classes (C2). In the determination step, a decision is made whether to use one or both of a first classification result that is a classification result obtained in the first classification step and a second classification result that is a classification result obtained in the second classification step, and a class of an object is determined based on the one or both of them. The first target data is image data of object (2). The second target data is manufacturing data regarding a manufacturing condition of object (2). The twelfth aspect can provide the classification method that can improve reliability regarding a class determination for object (2).

A program according to a thirteenth aspect is a program for causing one or more processors to execute the classification method in the twelfth aspect. The thirteenth aspect can provide a function that can improve the reliability regarding the class determination for object (2).

The configurations according to the second to eleventh aspects are not essential to classification system (1), and can be omitted as appropriate.

The classification system, the classification method, and the program of the present disclosure can offer an advantage that reliability regarding a class determination for an object can be improved. Thus, the invention of the present disclosure contributes to the improvement of reliability of a device and the like and is industrially useful.

The invention claimed is:

1. A classification system for determining a defect in a product, comprising:
a processor;
a first input interface that receives an image of the product captured by a camera, and inputs an image of the product as a first target data to the processor,
a second input interface that receives, as electrical signals, one or more feature quantities with respect to manufacturing data related to a manufacturing condition of the product obtained by one or more sensors, and inputs the one or more features quantities as a second target data to the processor,
a first storage device that comprises a first classification part and a plurality of first classes, wherein the first classification part classifies the first target data input from the first input interface into at least one first class among a plurality of first classes, thereby obtaining a first classification result;
a second storage device that comprises a second classification part and a plurality of second classes, wherein the second classification part classifies the second target data input from the second input interface into at least one second class among a plurality of second classes, thereby obtaining a second classification result; and
an output interface, wherein:
the processor:
decides whether to use one or both of the first classification result and the second classification result, determines whether the product has a defect or not, and when determined that the product has a defect, determines a class of the defect based on the one or both of the first classification result and the second classification result,
the output interface outputs information indicating that the product is in a normal state without a defect or information indicating that the product is in an anomalous state with a defect and the class,
the first classification part comprises a learned model that has learned the plurality of first classes from image data of multiple products, and
the second classification part comprises a model in which the plurality of second classes is associated with a data distribution of the one or more feature quantities.

2. The classification system according to claim 1, wherein the plurality of first classes and the plurality of second classes match each other.

3. The classification system according to claim 1, wherein the processor determines the class of the defect without using the second classification result when the first classification result satisfies a predetermined specifying condition.

4. The classification system according to claim 1, wherein
the first classification part performs classification based on a type of one or a plurality of events occurring in the product in the image data, and
the determination part determines the class of the product further using information about positions of the one or the plurality of events in the image data.

5. The classification system according to claim 4, wherein
when the first classification result indicates a result of classification into two or more of the plurality of first classes, the processor determines the class of the defect using the second classification result when two or more of the plurality of events related to two or more of the plurality of first classes are in one position, and the processor determines the class of the defect without using the second classification result when two or more of the plurality of events related to two or more of the plurality of first classes are in different positions.

6. The classification system according to claim 1, wherein the second classification result includes a plurality of specified regions respectively related to the plurality of second classes in a feature quantity space regarding the manufacturing condition, and
when using the second classification result, the processor determines the class of the defect based on distances from a feature quantity of the second target data in the feature quantity space to the plurality of specified regions.

7. The classification system according to claim 1, wherein the processor first uses the first classification result to determine the class of the defect, and determines the class of the defect using the second classification result when the first classification result includes uncertainty related to a class determination for the product.

8. The classification system according to claim 7, further comprising a functional part including a screen display or a speaker that executes predetermined processing in accordance with an output of the output interface.

9. The classification system according to claim 1, wherein the plurality of first classes and the plurality of second classes are defined by a defect of the product.

10. A classification method for determining a defect in a product, comprising:
receiving first target data including image data of the product;
receiving, as electric signals, one or more features quantities as a second target data, the one or more feature quantities being obtained by one or more sensors with respect to manufacturing data related to a manufacturing condition of the product;
performing first classification for classifying first target data into at least one first class among a plurality of first classes, thereby obtaining a first classification result and storing the first classification result in a first storage;
performing second classification for classifying second target data into at least one second class among a plurality of second classes, thereby obtaining a second classification result and storing the second classification result in a second storage;
deciding whether to use one or both of the first classification result and the second classification result;
determining whether the product has a defect or not;
when determined that the product has a defect, determining a class of the defect based on the one or both of the first classification result and the second classification result, and
outputting information indicating that the product is in a normal state without a defect or information indicating that the product is in an anomalous state with a defect and the class, wherein:
the first classification utilizes a learned model that has learned the plurality of first classes from image data of multiple products, and
the second classification utilizes a model in which the plurality of second classes is associated with a data distribution of the one or more feature quantities.

* * * * *